Aug. 3, 1937.  C. BERCHTOLD  2,088,991
TRAILER COUPLER
Filed Feb. 24, 1937
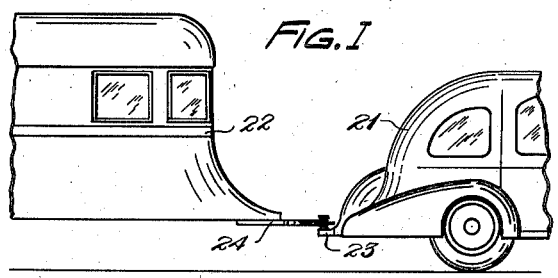
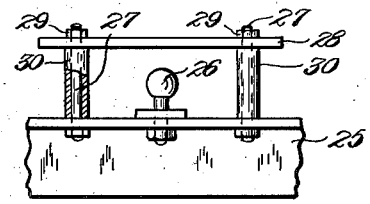
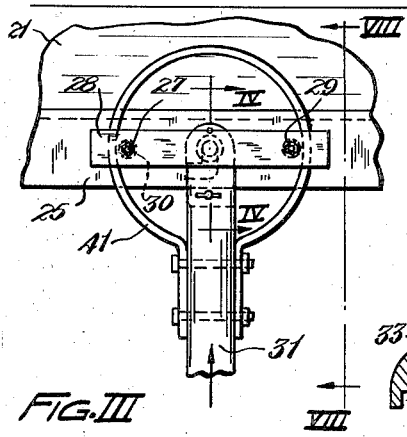
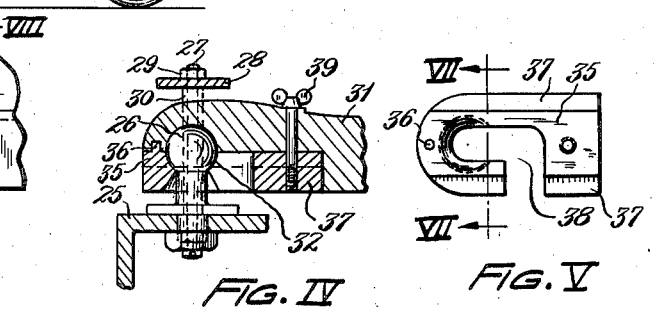
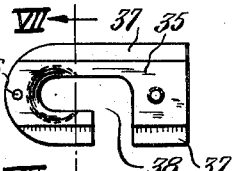
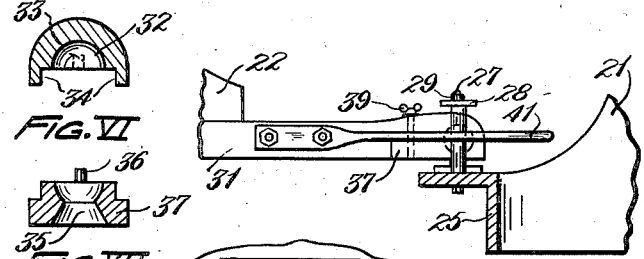
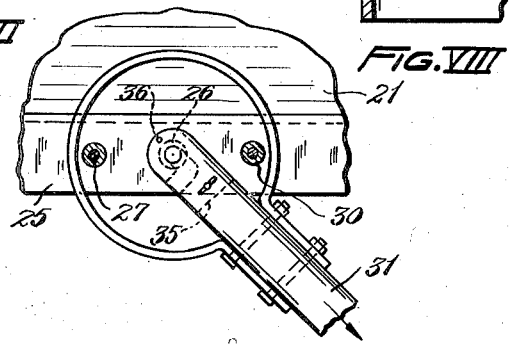
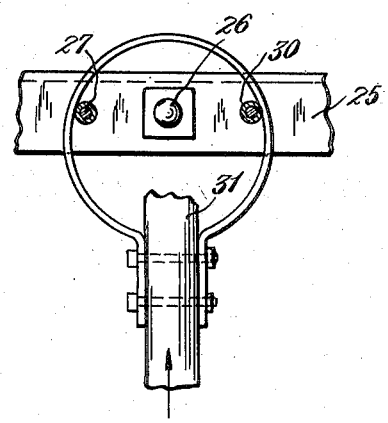
INVENTOR.
CHARLES BERCHTOLD
BY Morton S. Brockman
ATTORNEY.

Patented Aug. 3, 1937

2,088,991

UNITED STATES PATENT OFFICE 2,088,991

TRAILER COUPLER

Charles Berchtold, Cleveland, Ohio

Application February 24, 1937, Serial No. 127,473

5 Claims. (Cl. 280—33.15)

This invention relates to a coupling device for joining vehicles together and particularly to apparatus suitable for connecting a trailer to an automobile.

The primary object of the invention is to provide a novel joint and to supplement it with a novel auxiliary connecting means, which will insure the safe operation of the joint and which will prevent injury or damage in the event the main universal joint breaks while the vehicles are in rapid motion.

These and other features of my invention are more fully set forth hereinafter, reference being made to the accompanying drawing in which like parts are designated by like reference characters and in which:

Figure I is a side view of an automobile and a trailer joined together with my device, Figure II is a rear view of the drawbar portion of the coupler, Figure III is a top view of the drawbar and hitch in union, Figure IV is an enlarged side sectional view of the drawbar and universal joint, Figure V is an enlarged view of the gib or plate used for retaining the hitch to the drawbar, Figure VI is a cross sectional front view of tongue socket, Figure VII is a cross sectional view of gib taken along the lines VII—VII of Figure V, Figure VIII is a side view of the drawbar and hitch taken along the lines VIII—VIII of Figure III, Figure IX is a top view of the drawbar and hitch showing relative position of parts caused by a broken universal joint, and Figure X is a top view of the coupler when the vehicles are at an angle.

In the Figure I, there is shown a conventional automobile 21, to which is attached a trailer 22. Attached to the rear part of the automobile 21 there is a drawbar 23 and attached to the front part of the trailer 22, there is a hitch 24.

The drawbar 23 consists primarily of a horizontal bracket 25, to which there is rigidly attached a ball 26. Extending upwardly from the bracket 25 and on the sides of the ball 26 there are two pins 27, across the tops of which there is a horizontal bar 28 and which bar is held in place by nuts 29. This horizontal bar 28 extends laterally across the top of the ball 26. The pins 27 are encased in revolvable sleeves 30 for practically their entire distances between the horizontal bracket 25 and the bar 28.

The fore part of the hitch 24, called a tongue 31 has a socket 32, which fits over the ball 26, so as to form a universal joint. In the bottom of the tongue 31 and slightly forward of the socket 32, there is an aperture 33. There are also longitudinal grooves or rabbets 34 adjacent to the socket. In order to retain the ball 26 within the socket 32 there is attached a plate or gib 35 to the bottom of the tongue 31 just below the socket 32. This gib 35 has a peg 36, which fits into the aperture 33 and longitudinal side flanges 37, which fit into the rabbets 34. Also, in the gib 35 there is an L-shaped slot 38, which fits around and engages the neck of the ball 26, so that when the hitch 24 and the drawbar 23 are joined, the ball 26 will not separate from the socket 32. The gib 35 is drilled and tapped so that it can be held in place by the thumbscrew or key 39.

Attached to the forward part of the tongue 31, there is a loop 41 made of metal and large enough to encircle the socket 32 and to enclose the vertical pins 27 and sufficiently large enough to clear the said pins 27 even when the tongue 31 and the loop 41 are tilted off the normal horizontal position.

The loop 41 is smaller in diameter than the bar 28 is long. This is to prevent the loop 41 from disengaging the pins 27. In operation, the loop 41 floats freely around the pins 27 and between the bracket 25 and the bar 28. The universal joint is thus permitted sufficient horizontal and vertical movement necessary for this type of coupler. In the event that the loop 41 does contact or directly engage the pins 27 as shown in the Figure IX, the sleeves 30 act as bearings and allow the hitch 24 to have free horizontal movement as well as vertical movement with respect to the drawbar 23.

In order to join the hitch 24 to the drawbar 23, all the operator need do, is to remove the bar 28 from the pins 27; hook the gib 35 around the neck of the ball 26, so that the peg 36 faces forward and upward; place the tongue socket 32 over the ball 26, so that the peg 36 fits into the aperture 33 and the flanges 37 engage the rabbets 34, and fasten the gib 35 and tongue 31 together with the key 39; and then replace and fasten the bar 28 across the top of the pins 27. All the parts will then be in the positions shown in the Figures III and VIII.

As stated in the objects of this specification, providing for safety, is the primary purpose of this invention. It will therefore, be apparent that in the event the main or universal joint breaks or becomes loosened through accident or wear, the vehicles will still remain coupled and in a comparatively safe relationship. Its advantages over the prior types of auxiliary couplers is that in the event the main joint breaks, it prevents the forward end of the trailer from dropping to the ground, it prevents the trailer from whipping or throwing the automobile suddenly out of control, and it eliminates the sudden jar and shock as well as excessive stress and strain on both the vehicles, which might be caused by a sudden but delayed engagement of the ordinary auxiliary coupler.

It will now be clear that I have provided a trailer coupler of the character described, which will accomplish the objects of the invention hereinbefore stated. While I have described my invention in its preferred form and while I have utilized certain terms and language, it is to be understood that the embodiment of the invention as described is merely illustrative and is not to be considered in a limiting sense, as various changes may be made without departing from the spirit of the invention. It is therefore, further understood that the device may be modified to accommodate various types of universal joints and connecting devices, and that no limitations upon the invention are intended other than those imposed by the scope of the appended claims.

I claim:

1. In a trailer coupler, a drawbar, comprising in combination, a horizontal bracket, a ball mounted on the bracket, vertical pins mounted on the bracket adjacent to the ball, revolvable sleeves encasing the pins, and a horizontal bar attached to the pins and extending laterally over the ball.

2. A trailer coupler, comprising in combination, a horizontal bracket, a ball mounted on the bracket, vertical pins mounted on the bracket adjacent to the ball, a horizontal bar attached to the pins and extending laterally over the ball, a tongue having a socket engageable with the ball, and a loop attached to the tongue encircling the ball and the pins and floating between the bracket and the bar.

3. A trailer coupler, comprising in combination, a horizontal bracket, a ball mounted on the bracket, vertical pins mounted on the bracket adjacent to the ball, the said pins encased in revolvable sleeves, a horizontal bar attachable to the pins and extending laterally over the ball, a tongue having a socket and having a rabbet and an aperture adjacent thereto, a gib having a slot and having a flange and a peg adjacent thereto engageable with the said rabbet and the aperture for retaining the ball in the said socket, a key for holding the gib to the tongue in a fixed position, and a metal loop horizontally attached to the tongue encircling the ball and pins and floating between the bracket and the bar.

4. A trailer coupler, comprising in combination, a horizontal bracket, vertical pins mounted on the bracket, a horizontal bar mounted laterally on the said pins, a tongue, means in the said tongue engageable with the bracket, and a loop attached to the tongue encircling the said pins and the said means and floating between the bracket and the bar.

5. In a trailer coupler, a hitch, comprising in combination, a tongue having a horizontal loop attached thereto and a socket in the said tongue encircled by and within the said loop.

CHARLES BERCHTOLD.